(12) United States Patent
Forster et al.

(10) Patent No.: US 9,819,551 B2
(45) Date of Patent: Nov. 14, 2017

(54) SYSTEMS AND METHODS FOR TESTING NETWORKS WITH A CONTROLLER

(71) Applicant: Big Switch Networks, Inc., Mountain View, CA (US)

(72) Inventors: R. Kyle Forster, San Francisco, CA (US); Shudong Zhou, Fremont, CA (US); Robert W. Sherwood, Palo Alto, CA (US); Jason Parraga, Sunnyvale, CA (US)

(73) Assignee: Big Switch Networks, Inc., Santa Clara, CA (US)

( * ) Notice: Subject to any disclaimer, the term of this patent is extended or adjusted under 35 U.S.C. 154(b) by 133 days.

(21) Appl. No.: 14/085,538

(22) Filed: Nov. 20, 2013

(65) Prior Publication Data
US 2015/0138993 A1 May 21, 2015

(51) Int. Cl.
*H04L 12/24* (2006.01)
*H04L 12/26* (2006.01)

(52) U.S. Cl.
CPC .............. *H04L 41/12* (2013.01); *H04L 41/24* (2013.01); *H04L 43/50* (2013.01)

(58) Field of Classification Search
CPC ..... H04L 41/0893; H04L 41/00; H04L 41/12; H04L 41/24; H04L 43/50; H04L 45/34; H04L 41/5038; H04L 41/20; H04L 43/00; H04L 43/10; H04L 41/08
USPC ......................................... 370/248, 241, 244
See application file for complete search history.

(56) References Cited

U.S. PATENT DOCUMENTS

| | | | | |
|---|---|---|---|---|
| 5,822,520 A | * | 10/1998 | Parker | H04L 12/2697 709/217 |
| 7,194,661 B1 | * | 3/2007 | Payson | H04L 12/2697 370/242 |
| 8,116,312 B2 | | 2/2012 | Riddoch et al. | |
| 8,392,608 B1 | | 3/2013 | Miller et al. | |
| 8,908,539 B1 | * | 12/2014 | Pani | H04L 43/0811 370/248 |
| 9,007,922 B1 | * | 4/2015 | Mittal | H04L 43/50 370/242 |

(Continued)

OTHER PUBLICATIONS

Open Networking Foundation, "OpenFlow Switch Specification", Version 1.3.3, Sep. 27, 2013.*

(Continued)

*Primary Examiner* — Michael Thier
*Assistant Examiner* — Rownak Islam
(74) *Attorney, Agent, or Firm* — Treyz Law Group, P.C.; Michael H. Lyons; Tianyi He

(57) ABSTRACT

A controller may control switches such as physical and software switches in a network. The controller may generate virtual switches from groups of end hosts in forming a virtual network topology. The controller may receive one or more network policy rules that govern network traffic through the switches. For a given network policy rule, the controller may perform a test in determining whether the network satisfies the network policy rule. The test may be performed based on a testing rule identifying test parameters and expected test results. The controller may perform tests in determining whether the network satisfies the testing rule and the corresponding network policy rule. The tests may be performed via simulation at the controller or by injecting a tagged test packet into the network.

23 Claims, 16 Drawing Sheets

(56) References Cited

U.S. PATENT DOCUMENTS

| | | |
|---|---|---|
| 2002/0026525 A1* | 2/2002 | Armitage .............. H04L 12/185 709/238 |
| 2002/0061018 A1 | 5/2002 | Chien |
| 2004/0170173 A1 | 9/2004 | Pan et al. |
| 2005/0157749 A1 | 7/2005 | Lee et al. |
| 2008/0123536 A1 | 5/2008 | Johnson et al. |
| 2008/0130514 A1* | 6/2008 | Soon ................... H04L 12/2697 370/253 |
| 2008/0189769 A1 | 8/2008 | Casado et al. |
| 2009/0007218 A1 | 1/2009 | Hubbard |
| 2009/0109864 A1* | 4/2009 | Wang .................. G06F 11/2221 370/249 |
| 2010/0050229 A1* | 2/2010 | Overby, Jr. ............. H04L 63/20 726/1 |
| 2010/0128743 A1 | 5/2010 | Nagano |
| 2012/0106339 A1 | 5/2012 | Mishra et al. |
| 2012/0281698 A1* | 11/2012 | Forster ................ H04L 41/0806 370/392 |
| 2013/0060815 A1* | 3/2013 | Saeki ................ G06F 17/30575 707/802 |
| 2013/0301473 A1* | 11/2013 | Huang .................. H04L 41/046 370/254 |
| 2014/0122683 A1* | 5/2014 | Zhao ....................... H04L 45/64 709/223 |
| 2014/0123211 A1* | 5/2014 | Wanser ................. H04L 63/101 726/1 |
| 2014/0133305 A1* | 5/2014 | Brolin .................... H04L 43/10 370/235 |
| 2016/0050117 A1* | 2/2016 | Voellmy .............. H04L 12/6418 370/392 |
| 2016/0191371 A1* | 6/2016 | Dujodwala ......... H04L 12/4675 370/254 |

OTHER PUBLICATIONS

Pfaff et al., OpenFlow Switch Specification, Dec. 31, 2009, 42 pages.
McKeown et al., OpenFlow: Enabling Innovation in Campus Networks, Mar. 14, 2008, 6 pages.
Cisco Systems, Cisco Catalyst 6500 Architecture, 1992-2007, 28 pages.
Casado et al., "SANE: A Protection Architecture for Enterprise Networks," Usenix Security, Aug. 2006 (15 pages).
Casado et al., "Ethane: Taking Control of the Enterprise," Conference of Special Interest Group on Data Communication (SIGCOMM), Japan, Aug. 2007 (12 pages).
Koponen et al., "Onix: A Distributed Control Platform for Large-scale Production Networks," Usenix Security, Oct. 2010 (14 pages).
Sherwood et al. "FlowVisor: A Network Virtualization Layer," Open Flow Technical Reports, Oct. 14, 2009 (Abstract and 14 pages) [Retrieved on Jan. 4, 2011]. Retrieved from the Internet<URL: http://openflowswitch.org/downloads/technicalreports/openflow-tr-2009-1-flowvisor.pdf.
Peyman Kazemian et al., Real Time Network Policy Checking using Heater Space Analysis, 10th USENIX Symposium on Networked Systems Design and Implementation, USA, USENIX Association, Apr. 2, 2013, pp. 99-111. URL: https://www.usenix.org/systems/filed/tech-schedule/nsdi13-proceedings.pdf#page=108>.

* cited by examiner

| PHYSICAL INPUT PORT | SOURCE ETHERNET ADDRESS | DESTINATION ETHERNET ADDRESS | SOURCE IP ADDRESS | DESTINATION IP ADDRESS | SOURCE TCP PORT | DESTINATION TCP PORT | ADDITIONAL PACKET INFORMATION (E.G., HEADERS) | ACTION |
|---|---|---|---|---|---|---|---|---|
| * | * | 00:1FAB | * | * | * | * | | SEND TO PORT 3 |
| * | * | * | * | 172.12.3.4 | * | * | ... | SEND TO PORT 4 |
| * | * | * | * | * | * | 80 | | DROP |

FIG. 4

| LOGICAL PORT | END HOST IDENTIFICATION (E.G., MAC, IP, ALIAS, ETC.) | PROTOCOL PORT | ACTION |
|---|---|---|---|
| VP$_2$ OF VSW$_1$ | MACEH$_1$ | 80 | DROP |

ACCESS CONTROL LIST

FIG. 8

| DESTINATION MAC ADDRESS | SOURCE MAC ADDRESS | TCP PORT | ACTION |
|---|---|---|---|
| ... | MACEH$_2$ | MACEH$_1$ | 80 | DROP |

FIG. 9

| INCOMING PORT | DESTINATION MAC ADDRESS | TCP PORT | ACTION |
|---|---|---|---|
| ... | P$_1$ | MACEH$_2$ | 80 | DROP |

FIG. 10

NETWORK POLICY RULE

SYSTEMS AND METHODS FOR TESTING NETWORKS WITH A CONTROLLER

BACKGROUND

This relates to communication networks, and more particularly, to communications networks having network switches that are controlled by a controller.

Packet-based networks such as the internet and local data networks that are connected to the internet include network switches. Network switches are used in forwarding packets from packet sources to packet destinations. The packets may be sometimes referred to as frames.

It can be difficult or impossible to control the switches of one vendor using the equipment of another vendor. This is because the switch equipment of one vendor may use a different operating system and set of control procedures than the switch equipment of another vendor. To address the challenges associated with controlling different types of switch platforms, cross-platform protocols have been developed. These protocols allow centralized control of otherwise incompatible switches.

Cross-platform controller clients can be included on the switches in a network. The controller clients are able to communicate with a corresponding controller server over network paths. Because the controller clients can be implemented on a variety of switch hardware, it is possible for a single controller to control switch equipment that might otherwise be incompatible.

It can be challenging for a controller to efficiently control a network of switches. For example, the network topology may be modified by a network administrator or due to device failure. In this scenario, the network modifications may potentially result in invalid configurations at the controller. It would therefore be desirable to provide the controller with improved capabilities.

SUMMARY

A controller may control switches such as physical and software switches in a network. The controller may generate virtual switches from groups of end hosts. Each virtual switch may have virtual ports that are assigned to respective end hosts. The controller may generate a virtual network topology from the virtual switches.

The controller may receive one or more network policy rules that govern network traffic through the switches. Network policy rules may be defined for respective virtual ports such that the network policy rules govern network traffic that flows through the virtual ports. For a given network policy rule, the controller may perform a test in determining whether the network satisfies the network policy rule. The test may be performed based on a testing rule received by the controller (e.g., from a user). The testing rule may identify test parameters and expected test results. The controller may generate a test packet based on the test parameters of the testing rule. For example, the test packet may include source and destination end host information or other header fields determined from the test parameters.

The controller may simulate packet traversal of the test packet through a virtual path of the virtual network topology. The controller may identify network policy rules that are triggered during simulation. The controller may determine a set of switches that form an underlying path of the virtual path. The controller may generate flow table entries implementing the underlying path without providing the flow table entries to the set of switches (e.g., so that normal forwarding operations of the network are not altered during testing). Based on simulation results such as the triggered network policy rules or the switches that are traversed by the test packet, the controller may determine whether the network satisfies the network policy rule.

If desired, the controller may tag a test packet and inject the tagged test packet into the network. The test packet may be tagged by inserting identification information into header fields or by encapsulating the test packet. The controller may provide flow table entries to the switches that direct the switches to send information on the tagged test packet to the controller. The information may identify which switch ports the tagged test packet was received at. The flow table entries may prevent the switches from forwarding the tagged test packet to a destination end host of the tagged test packet, which helps to ensure that normal operation of the end hosts is not disrupted by controller testing of network policy rules. Based on the information from the switches, the controller may determine whether the network satisfies the expected results of the testing rule and a corresponding network policy rule.

Further features of the present invention, its nature and various advantages will be more apparent from the accompanying drawings and the following detailed description.

BRIEF DESCRIPTION OF THE DRAWINGS

FIG. 4 is a diagram of an illustrative flow table of the type that may be used by a packet processing system showing three illustrative types of packet forwarding that may be performed based on the flow table entries of the flow table in accordance with an embodiment of the present invention.

FIG. 8 is an illustrative access control list that may be implemented by a controller in accordance with an embodiment of the present invention.

FIG. 9 is a first illustrative flow table entry that may be generated by a controller in implementing a network policy rule in accordance with an embodiment of the present invention.

FIG. 10 is a second illustrative flow table entry that may be generated by a controller in implementing a network policy rule in accordance with an embodiment of the present invention.

DETAILED DESCRIPTION

Networks such as the internet and the local and regional networks that are coupled to the internet rely on packet-based switches. These switches, which are sometimes referred to herein as network switches, packet processing systems, or packet forwarding systems can forward packets based on address information. As examples, the switches may include routers, firewalls, load balancers, or other packet forwarding systems. In this way, data packets that are transmitted by a packet source may be delivered to a packet destination. In network terms, packet sources and destinations are sometimes referred to as end hosts. Examples of end hosts are personal computers, servers, and other computing equipment such as portable electronic devices that access the network using wired or wireless technologies.

Network switches range in capability from relatively small Ethernet switches and wireless access points to large rack-based systems that include multiple line cards, redundant power supplies, and supervisor capabilities. It is not uncommon for networks to include equipment from multiple vendors. Network switches from different vendors can be interconnected to form a packet forwarding network, but can be difficult to manage in a centralized fashion due to incompatibilities between their operating systems and control protocols.

These potential incompatibilities can be overcome by incorporating a common cross-platform control module (sometimes referred to herein as a controller client) into each network switch. A centralized cross-platform controller server may interact with each of the control clients over respective network links. The use of a cross-platform controller server and corresponding controller clients allows potentially disparate network switch equipment to be centrally managed.

Figure 1:
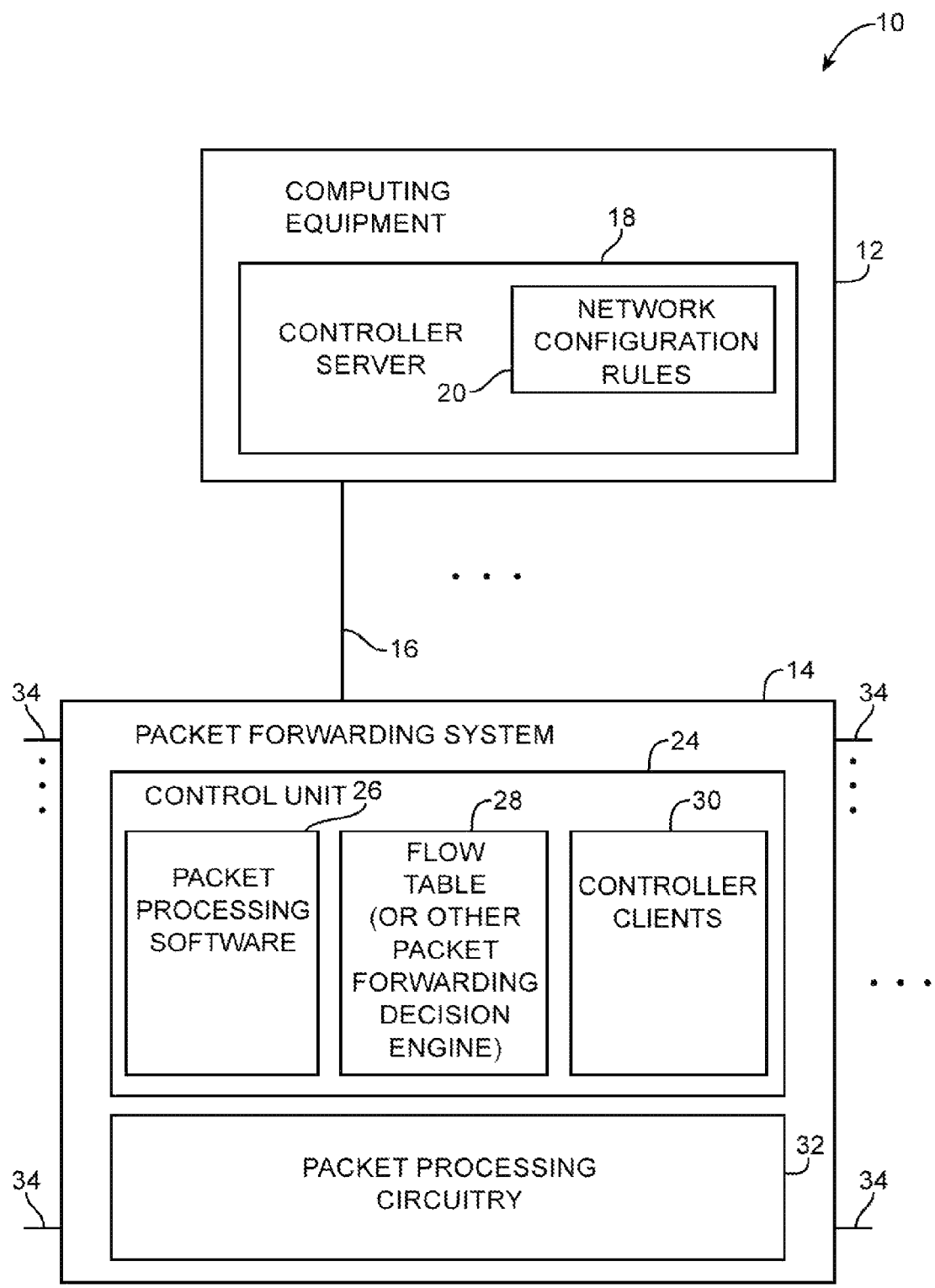
FIG. 1 is a diagram of an illustrative network that includes a controller and a packet forwarding system in accordance with an embodiment of the present invention.

With one illustrative configuration, which is sometimes described herein as an example, centralized control is provided by one or more controller servers such as controller server 18 of FIG. 1. Controller server 18 may be implemented on a stand-alone computer, on a cluster of computers, on a set of computers that are distributed among multiple locations, on hardware that is embedded within a network switch, or on other suitable computing equipment 12. Controller server 18 can run as a single process on a single computer or can be distributed over several hosts for redundancy. The use of a distributed arrangement may help provide network 10 with resiliency against unexpected network partitions (e.g., a situation in which a network link between two campuses is disrupted).

In distributed controller arrangements, controller nodes can exchange information using an intra-controller protocol. For example, if a new end host connects to network hardware (e.g., a switch) that is only connected to a first controller node, that first controller node may use the intra-controller protocol to inform other controller nodes of the presence of the new end host. If desired, a switch or other network component may be connected to multiple controller nodes. Arrangements in which a single controller server is used to control a network of associated switches are sometimes described herein as an example.

Controller server 18 of FIG. 1 may gather information about the topology of network 10. For example, controller server 18 may send Link Layer Discovery Protocol (LLDP) probe packets through the network to discover the topology of network 10. Controller server 18 may use information on network topology and information on the capabilities of network equipment to determine appropriate paths for packets flowing through the network. Once appropriate paths have been identified, controller server 18 may send corresponding settings data to the hardware in network 10 to ensure that packets flow through the network as desired. Network configuration operations such as these may be performed during system setup operations, continuously in the background, or in response to the appearance of newly transmitted data packets (i.e., packets for which a preexisting path has not been established).

Controller server 18 may be used to implement network configuration rules 20. Rules 20 may specify which services are available to various network entities. As an example, rules 20 may specify which users (or type of users) in network 10 may access a particular server. Rules 20 may, for example, be maintained in a database at computing equipment 12.

Controller server 18 and controller clients 30 at respective network switches 14 may use network protocol stacks to communicate over network links 16.

Each switch (e.g., each packet forwarding system) 14 may have input-output ports 34 (sometimes referred to as network switch interfaces). Cables may be used to connect pieces of equipment to ports 34. For example, end hosts such as personal computers, web servers, and other computing equipment may be plugged into ports 34. Ports 34 may also be used to connect one of switches 14 to other switches 14.

Packet processing circuitry 32 may be used in forwarding packets from one of ports 34 to another of ports 34 and may be used in performing other suitable actions on incoming packets. Packet processing circuit 32 may be implemented using one or more integrated circuits such as dedicated high-speed switch circuits and may serve as a hardware data path. If desired, packet processing software 26 that is running on control unit 24 may be used in implementing a software data path.

Control unit 24 may include processing and memory circuits (e.g., one or more microprocessors, memory chips, and other control circuitry) for storing and running control software. For example, control unit 24 may store and run software such as packet processing software 26, may store flow table 28, and may be used to support the operation of controller clients 30.

Controller clients 30 and controller server 18 may be compliant with a network switch protocol such as the OpenFlow protocol (see, e.g., OpenFlow Switch Specification version 1.0.0). One or more clients among controller clients 30 may also be compliant with other protocols (e.g., the Simple Network Management Protocol). Using the OpenFlow protocol or other suitable protocols, controller server 18 may provide controller clients 30 with data that determines how switch 14 is to process incoming packets from input-output ports 34.

With one suitable arrangement, flow table data from controller server 18 may be stored in a flow table such as flow table 28. The entries of flow table 28 may be used in configuring switch 14 (e.g., the functions of packet processing circuitry 32 and/or packet processing software 26). In a typical scenario, flow table 28 serves as cache storage for flow table entries and a corresponding version of these flow table entries is embedded within the settings maintained by the circuitry of packet processing circuitry 32. This is, however, merely illustrative. Flow table 28 may serve as the exclusive storage for flow table entries in switch 14 or may be omitted in favor of flow table storage resources within packet processing circuitry 32. In general, flow table entries may be stored using any suitable data structures (e.g., one or more tables, lists, etc.). For clarity, the data of flow table 28 (whether maintained in a database in control unit 24 or embedded within the configuration of packet processing circuitry 32) is referred to herein as forming flow table entries (e.g., rows in flow table 28).

The example of flow tables 28 storing data that determines how switch 14 is to process incoming packets are merely illustrative. If desired, any packet forwarding decision engine may be used in place of or in addition to flow tables 28 to assist packet forwarding system 14 to make decisions about how to forward network packets. As an example, packet forwarding decision engines may direct packet forwarding system 14 to forward network packets to predetermined ports based on attributes of the network packets (e.g., based on network protocol headers).

Any desired switch may be provided with controller clients that communicate with and are controlled by a controller server. For example, switch 14 may be implemented using a general purpose processing platform that runs control software and that omits packet processing circuitry 32. As another example, switch 14 may be implemented using control circuitry that is coupled to one or more high-speed switching integrated circuits ("switch ICs"). As yet another example, switch 14 may be implemented as a line card in a rack-based system having multiple line cards each with its own packet processing circuitry. The controller server may, if desired, be implemented on one or more line cards in the rack-based system, in another rack-based system, or on other computing equipment that is coupled to the network.

Figure 2:
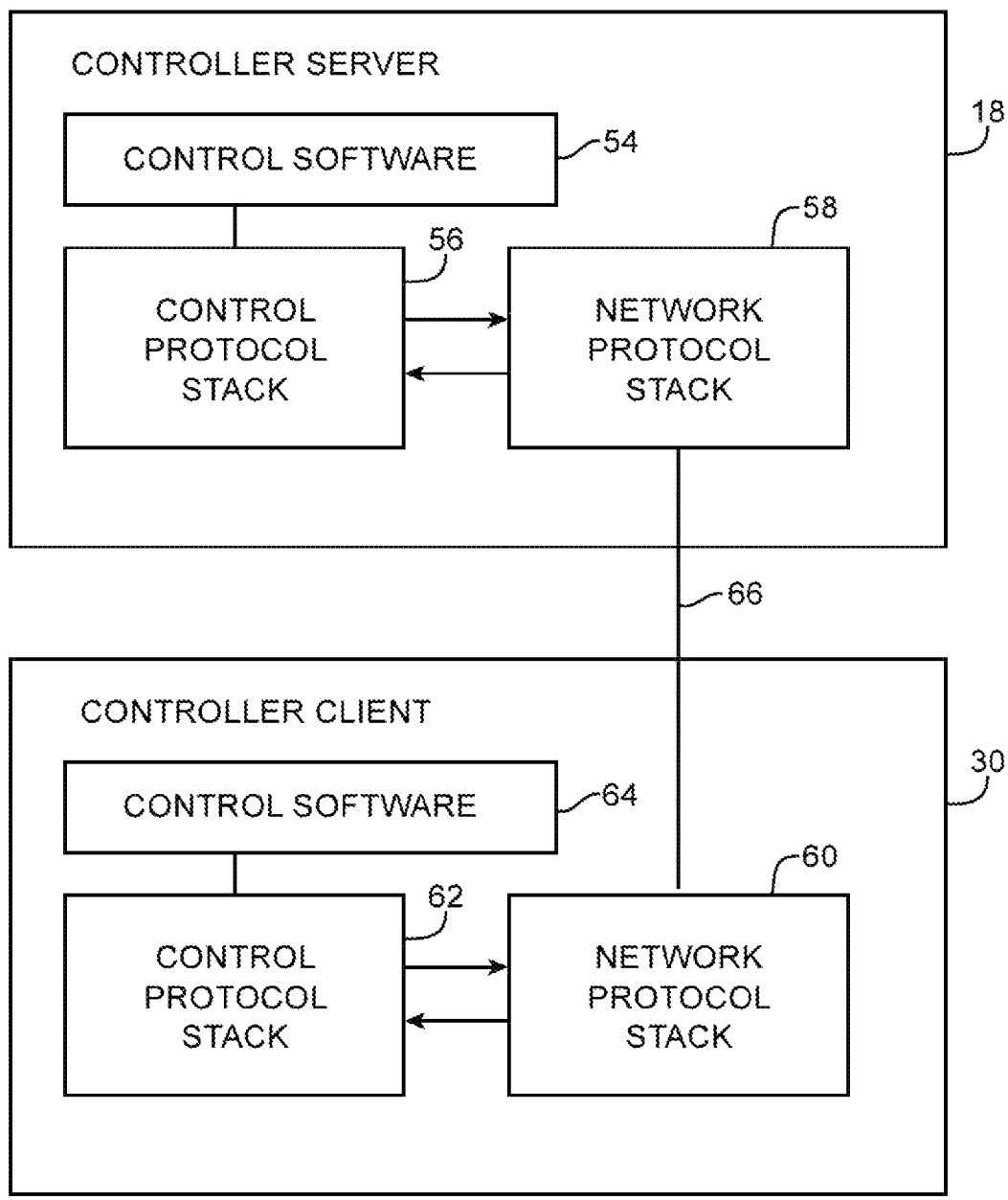
FIG. 2 is a diagram of a controller server and controller client that may communicate over a network connection in accordance with an embodiment of the present invention.

As shown in FIG. 2, controller server 18 and controller client 30 may communicate over network path 66 using network protocol stacks such as network protocol stack 58 and network protocol stack 60. Stacks 58 and 60 may be, for example Linux TCP/IP stacks or the TCP/IP stack in the VxWorks operating system (as examples). Path 66 may be, for example, a path that supports a network connection between switch 14 and external equipment (e.g., network path 16 of FIG. 1) or may be a backbone path in a rack-based system. Arrangements in which path 66 is a network path such as path 16 are sometimes described herein as an example.

Control protocol stack 56 serves as an interface between network protocol stack 58 and control software 54. Control protocol stack 62 serves as an interface between network protocol stack 60 and control software 64. During operation, when controller server 18 is communicating with controller client 30, control protocol stacks 56 generate and parse control protocol messages (e.g., control messages to activate a port or to install a particular flow table entry into flow table 28). By using arrangements of the type shown in FIG. 2, a network connection is formed over the link between controller server 18 and controller client 30. Controller server 18 and controller client 30 can communicate using a Transmission Control Protocol (TCP) or User Datagram Protocol (UDP) over Internet Protocol (IP) network connection. Examples of control protocols that may be used when communicating between controller server 18 and controller clients 30 over the network connection include SNMP and OpenFlow protocol stack version 1.0.0 (as examples).

Flow table 28 contains flow table entries (e.g., rows in the table) that have multiple fields (sometimes referred to as header fields). The fields in a packet that has been received by switch 14 can be compared to the fields in the flow table. Each flow table entry may have associated actions. When there is a match between the fields in a packet and the fields in a flow table entry, the corresponding action for that flow table entry may be taken.

Figure 3:
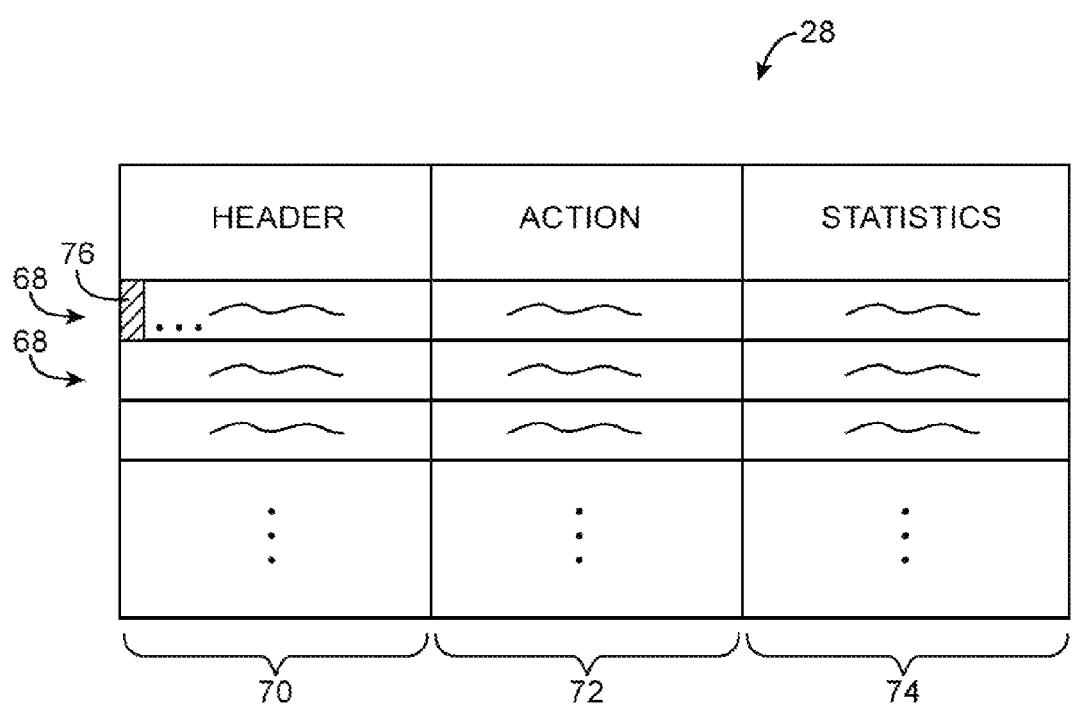
FIG. 3 is a diagram of an illustrative flow table of the type that may be used by a packet processing system in accordance with an embodiment of the present invention.

An illustrative flow table is shown in FIG. 3. As shown in FIG. 3, table 28 may have flow table entries (rows) 68. Each flow table entry may be associated with header 70, action 72, and statistics 74. Headers 70 may each include multiple header fields 76. The action in each flow table entry indicates what action switch 14 is to perform on the packet when a match is detected between the fields in the packet and the corresponding fields in the header of that flow table entry. Switch 14 may maintain statistical data (counter values) in the statistics portion of flow table 28 that can be queried by controller server 18 when it is desired to obtain information on the performance of switch 14.

The header fields in header 70 (and the corresponding fields in each incoming packet) may include the following fields: ingress port (i.e., the identity of the physical port in switch 14 through which the packet is being received), Ethernet source address, Ethernet destination address, Ethernet type, virtual local area network (VLAN) identification (sometimes referred to as a VLAN tag), VLAN priority, IP source address, IP destination address, IP protocol, IP ToS (type of service) bits, Transport source port/Internet Control Message Protocol (ICMP) Type (sometimes referred to as source TCP port), and Transport destination port/ICMP Code (sometimes referred to as destination TCP port). Other fields may be used if desired. For example, a network protocol field and a protocol port field may be used.

Each flow table entry (flow entry) is associated with zero or more actions that dictate how the switch handles matching packets. If no forward actions are present, the packet is preferably dropped. The actions that may be taken by switch 14 when a match is detected between packet fields and the header fields in a flow table entry may include the following actions: forward (e.g., ALL to send the packet out on all interfaces, not including the incoming interface, CONTROLLER to encapsulate and send the packet to the controller server, LOCAL to send the packet to the local networking stack of the switch, TABLE to perform actions in flow table 28, IN_PORT to send the packet out of the input port, NORMAL to process the packet with a default forwarding path that is supported by the switch using, for example, traditional level 2, VLAN, and level 3 processing, and FLOOD to flood the packet along the minimum forwarding tree, not including the incoming interface). Additional actions that may be taken by switch 14 include: an enqueue action to forward a packet through a queue attached to a port and a drop action (e.g., to drop a packet that matches a flow table entry with no specified action). Modify-field actions may also be supported by switch 14. Examples of modify-field actions that may be taken include: Set VLAN ID, Set VLAN priority, Strip VLAN header, Modify VLAN tag, Modify Ethernet source MAC (Media Access Control) address, Modify Ethernet destination MAC address, Modify IPv4 source address, Modify IPv4 ToS bits, Modify transport destination port.

FIG. 4 is an illustrative flow table having three flow table entries. The entries include fields with wildcards (e.g., "*" symbols). When a wildcard is present in a particular field, all incoming packets will be considered to form a "match" with respect to the field, regardless of the particular value of the field in the incoming packet. Additional fields may match additional packet information (e.g., packet header information of network packets).

The entry of the first row of the FIG. 4 table directs the switch in which the flow table entry is operating to perform Ethernet switching. In particular, incoming packets with matching Ethernet destination addresses are forwarded to port 3.

The entry of the second row of table of FIG. 4 illustrates how a switch may be configured to perform internet routing (i.e., packets are forwarded based on their destination IP address).

The third row of the table of FIG. 4 contains an entry that illustrates how a switch may be configured to perform firewalling. When a packet is received that has a destination IP port value of 80, that packet is dropped (i.e., the switch is configured to serve as a firewall that blocks port 80 traffic).

Flow table entries of the type shown in FIG. 4 may be loaded into a switch 14 by controller server 18 during system setup operations or may be provided to a switch 14 from controller server 18 in real time in response to receipt and processing of packets at controller server 18 from switches such as switch 14. In a network with numerous switches 14, each switch can be provided with appropriate flow table entries to form a path through the network.

Figure 5:
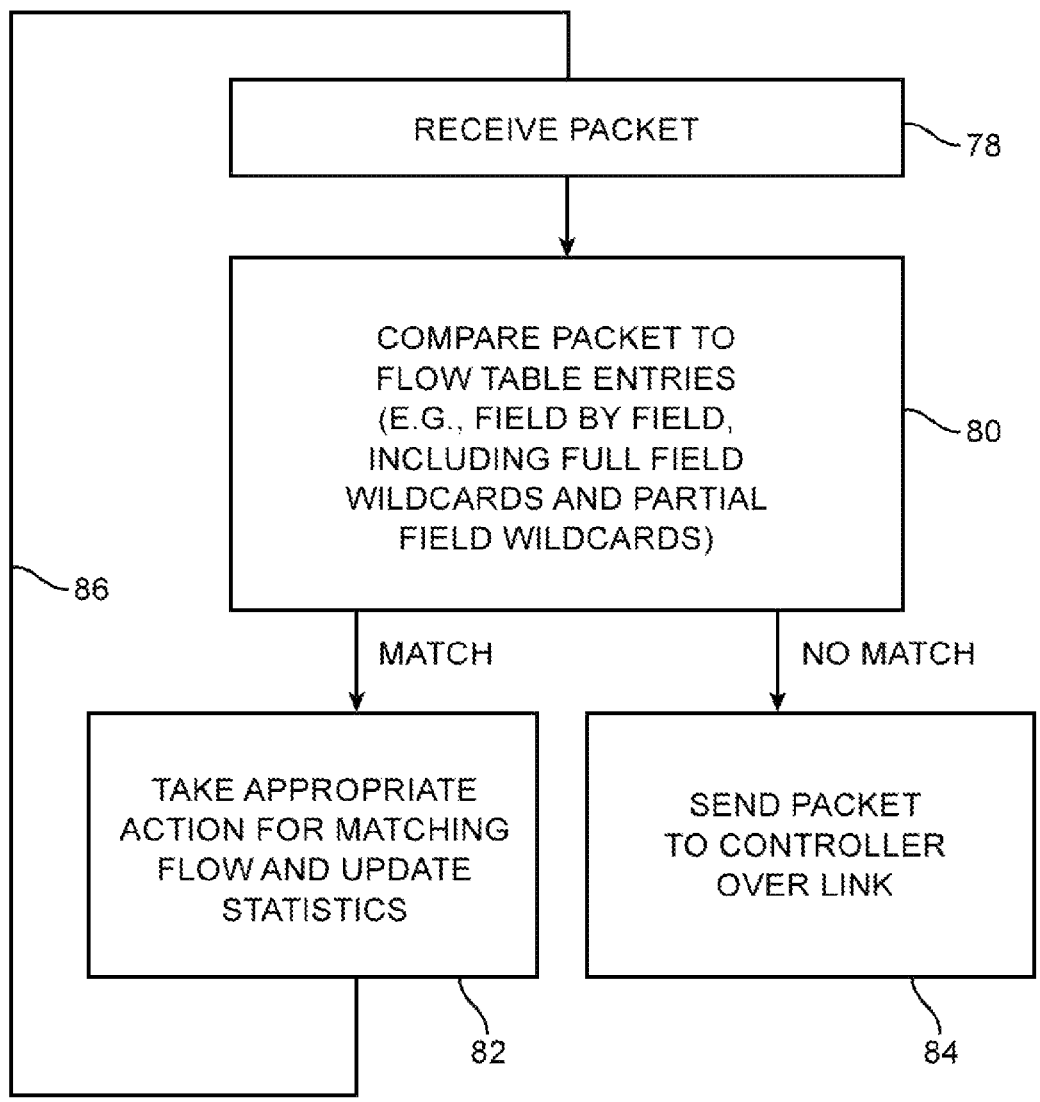
FIG. 5 is a flow chart of illustrative steps involved in processing packets in a packet processing system in accordance with an embodiment of the present invention.

Illustrative steps that may be performed by switch 14 in processing packets that are received on input-output ports 34 are shown in FIG. 5. At step 78, switch 14 receives a packet on one of its ports (e.g., one of input-output ports 34 of FIG. 1).

At step 80, switch 14 compares the fields of the received packet to the fields of the flow table entries in the flow table 28 of that switch to determine whether there is a match. Some fields in a flow table entry may contain complete values (e.g., complete addresses). Other fields may contain wildcards (i.e., fields marked with the "don't care" wildcard character of "*"). Yet other fields may have partially complete entries (e.g., a partial address that is partially wildcarded). Some fields may use ranges (e.g., by restricting a TCP port number to a value between 1 and 4096) and in effect use the range to implement a type of partial wildcarding. In making field-by-field comparisons between the received packet and the flow table entries, switch 14 can take into account whether or not each field in the flow table entry contains a complete value without any wildcarding, a partial value with wildcarding, or a wildcard character (i.e., a completely wildcarded field).

If it is determined during the operations of step 80 that there is no match between the fields of the packet and the corresponding fields of the flow table entries, switch 14 may send the packet to controller server 18 over link 16 (step 84).

If it is determined during the operations of step 80 that there is a match between the packet and a flow table entry, switch 14 may perform the action that is associated with that flow table entry and may update the counter value in the statistics field of that flow table entry (step 82). Processing may then loop back to step 78, so that another packet may be processed by switch 14, as indicated by line 86.

Figure 6:
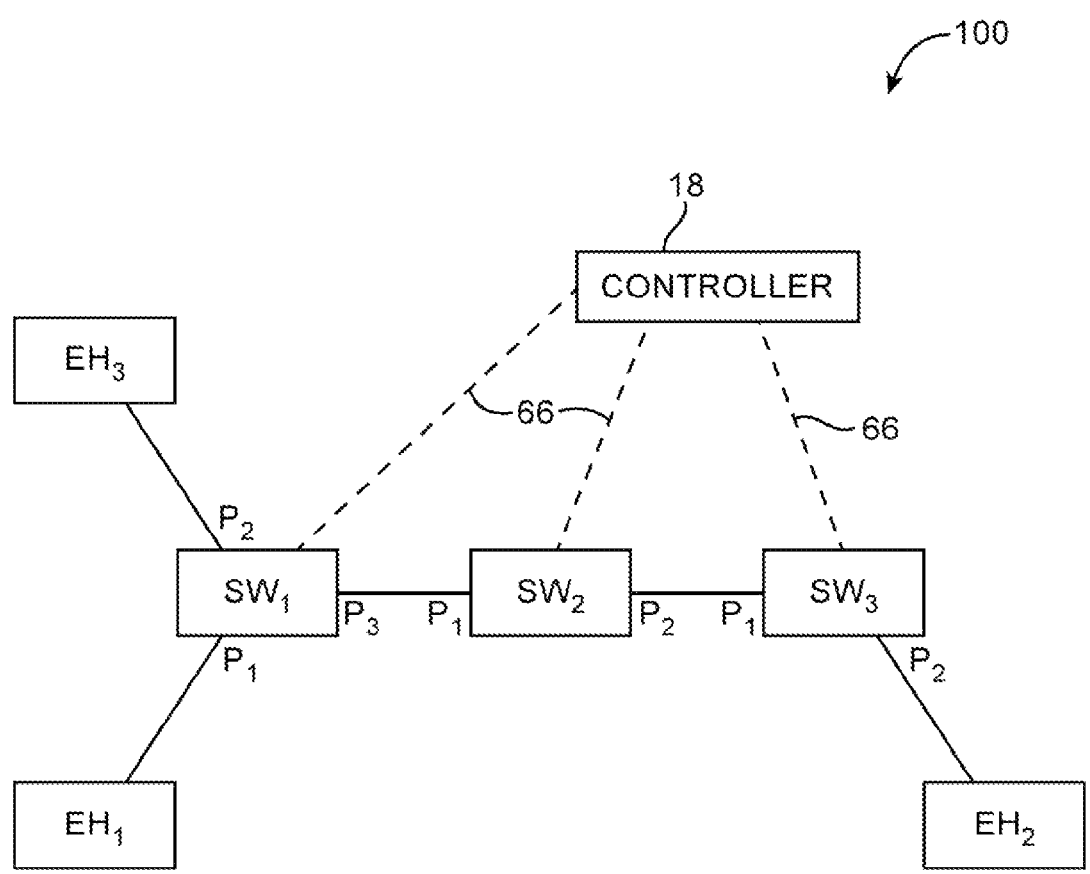
FIG. 6 is an illustrative network including switches that may be controlled by a controller in accordance with an embodiment of the present invention.

FIG. 6 is a diagram of an illustrative network 100 in which switches may be controlled by a controller 18. Controller 18 may be a controller server or a distributed controller implemented across multiple computing equipment. As shown in FIG. 6, network 100 may include switches SW1, SW2, and SW3. The switches may be physical switches that are implemented with dedicated switching circuitry or may be software switches. Examples of software switches include hypervisor switches implemented using software on discrete computing equipment (e.g., on a server in a rack-based system). Such software switches are coupled to the rest of the network by cables plugged into dedicated physical ports of the computing equipment on which the software switch is implemented (e.g., each software switch is constrained and tied to the physical ports of a given server on which the software switch is implemented).

Controller 18 may be coupled to the switches of network 100 via control paths 66. Controller 18 may control the switches using control paths 66 (e.g., by providing flow table entries such as flow table entries 68 of FIG. 3).

Network 100 may include end hosts such as end hosts EH1, EH2, and EH3 that are coupled to the switches of network 100. In the example of FIG. 6, end hosts EH1 and EH3 are coupled to ports P1 and P2 of switch SW1, whereas end host EH2 is coupled to port P2 of switch SW3. Ports of switches may be coupled to ports of other switches. For example, port P3 of switch SW1 may be coupled to port P1 of switch SW2 and port P2 of switch SW2 may be coupled to port P1 of switch SW3. Packets received from a first end host at a switch port may be forwarded to a second end host by switches that are coupled between the end hosts.

Figure 7:
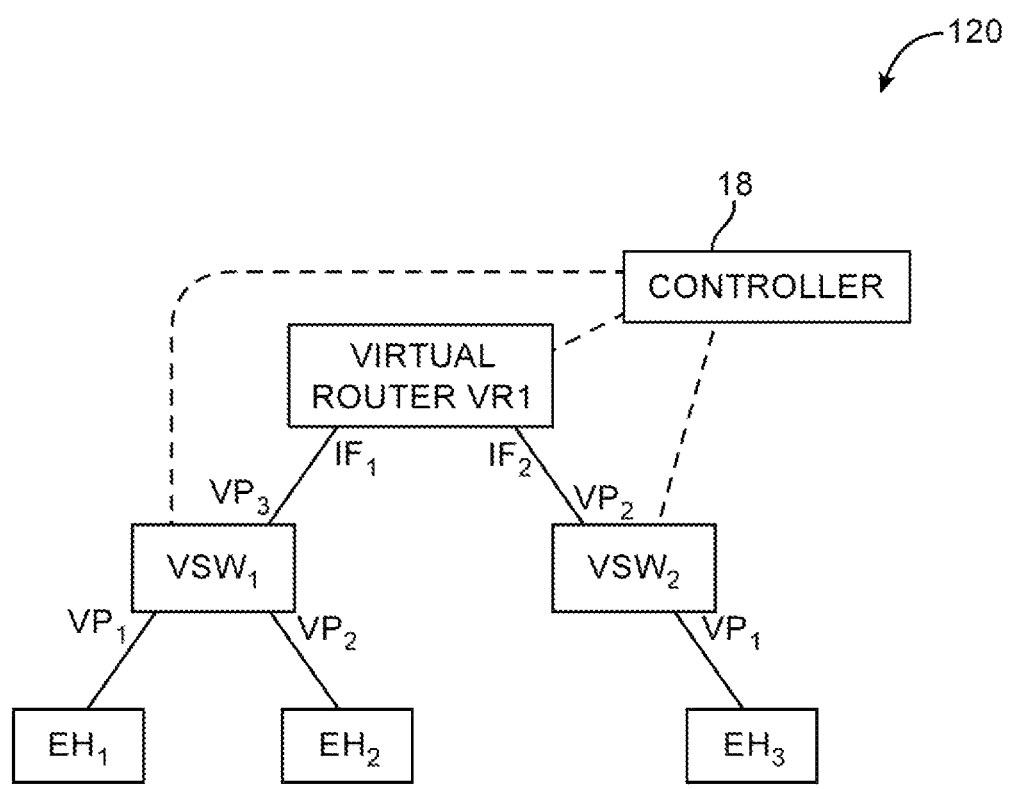
FIG. 7 is an illustrative virtual network that may be generated by a controller from an underlying network in accordance with an embodiment of the present invention.

It can be challenging for a user such as a network administrator to configure network 100 for desired operations. For example, it can be desirable to isolate or otherwise limit communications between groups of end hosts. As another example, it can be inefficient for a network administrator to manually configure network policy (e.g., routing rules, access control lists, etc.) for each switch and each end host of the network. Controller 18 may be configured to implement a logical network topology of virtual routers and virtual switches over the underlying network topology (e.g., a physical network topology). The logical network topology may provide benefits such as improved network configuration efficiency, flexibility, and capabilities. FIG. 7 is an illustrative example in which controller 18 is configured to implement a virtual network topology 120 from underlying network 100 of FIG. 6.

Virtual network topology 120 may be any desired topology within the physical constraints of underlying network 100 (e.g., each virtual path has at least one if not more corresponding paths in the underlying network). The underlying paths may include physical switches and/or software-based switches.

As shown in FIG. 7, virtual network topology 120 may include virtual switches such as VSW1 and VSW2 and virtual routers such as VR1. Virtual switches are formed from groups of end hosts of the network and may be defined by any desired network attributes of the end hosts. If desired, a virtual switch may be assigned end hosts that are coupled to different underlying physical or software switches. Virtual switch VSW1 may be assigned end hosts EH1 and EH2, whereas virtual switch VSW2 may be may be assigned end host EH3. Virtual switches may have virtual ports that are coupled to end hosts and other elements in the virtual network topology. For example, virtual switch VSW1 may have virtual ports VP1, VP2, and VP3 that are coupled to end host EH1, end host EH2, and virtual router VR1. Similarly, virtual switch VSW2 may have virtual ports VP1 and VP2 that are coupled to end host EH3 and virtual router VR1, respectively.

Examples of network attributes that may be used in characterizing an end host include the physical or hypervisor switch port to which the end host is coupled, a hardware address of the end host (e.g., a MAC address), a protocol address of the end host (e.g., an IP address), a virtual local area network (VLAN) tag, and/or other network attributes of the end host. For example, controller 18 may identify end host EH1 as attached to port P1 of switch SW1, may identify end host EH2 by MAC address, and may identify end host EH3 by IP address. As another example, in the scenario in which switch SW3 is a hypervisor switch, end host EH2 may be identified by a logical hypervisor port to which end host EH2 is coupled. These examples are merely illustrative. Any desired network attribute such as used in network packet header fields or any desired combination of network attributes may be used in assigning end hosts to virtual switches and any desired number of distributed virtual switches may be generated from the underlying network of physical and hypervisor switches.

Virtual switches may be grouped to form one or more virtual routers. In the example of FIG. 7, virtual switches VSW1 and VSW2 are grouped to form virtual router VR1. In other words, the groups of end hosts of virtual switches VSW1 and VSW2 are assigned to virtual router VR1. Each virtual switch serves to implement a respective broadcast domain in which broadcast network packets are forwarded to all end hosts of the virtual switch. The broadcast network packets may be network packets having header fields identifying the network packets as broadcast network packets that are destined for all end hosts of an associated broadcast domain. For example, broadcast network packets received by virtual switch VSW1 from end host EH2 may be forwarded by virtual switch VSW1 to each other end host that is assigned to virtual switch VSW1 (i.e., to end host EH1).

Virtual routers perform network routing functions and provide isolation for the different broadcast domains of the virtual switches. For example, virtual router VR1 may prevent broadcast packets from being forwarded by virtual switch VSW1 to virtual switch VSW2 (and vice versa). The broadcast domains may be defined in terms of IP address ranges such that each interface of a given virtual router is assigned a different respective IP address range. For example, a first IP address range may be assigned to interface IF1 and virtual switch VSW1, whereas a second IP address range may be assigned to interface IF2 and virtual switch VSW2. In the example of FIG. 7, in contrast to virtual routers, virtual switches do not perform any network routing functions based on IP domains. However, if desired, virtual routers may be omitted and virtual switches may perform forwarding and routing functions.

Network routing functions that may be performed by a virtual router include modifying headers of network packets received at interfaces of the virtual router. The virtual router may decrement a time-to-live IP header field of the network packet. The virtual router may modify Ethernet headers such as source and destination MAC address fields to correspond with a desired broadcast domain. For example, each interface of the virtual router may be assigned a respective Ethernet address. In this scenario, the virtual router may rewrite the source MAC address fields to match the egress (outgoing) interface of the virtual router. The virtual router may rewrite the destination MAC address field to match a next-hop address.

Controller 18 may be used to apply and enforce network policy rules at logical ports of the virtual network (e.g., virtual ports of distributed virtual switches or interfaces of distributed virtual routers). Network policy rules may include network routing rules that help determine network paths between end hosts and may include access control lists that allow or block selected network traffic. The network policy rules may be provided by a user. FIG. 8 is a diagram of an illustrative access control list that may be implemented by controller 18.

As shown in FIG. 8, access control list 132 identifies network attributes such as logical port, end host information, and protocol port. In general, any desired network attribute such as one or more logical ports, physical ports and/or packet header fields may be included in access control list 132. The packet header fields may include header fields that identify one or more end hosts (e.g., a source or a destination end host). For example, access control list 132 may include end host identification fields such as source MAC address, source IP address, destination MAC address, and/or destination IP address. If desired, an end host may be identified via an alias (e.g., a string of characters) that may be mapped to an end host using a database.

Controller 18 may generate flow table entries that implement the network policy rule defined by access control list 132. In the example of FIG. 8, access control list 132 identifies logical port VP2 of virtual port VSW1, the MAC address of end host EH1 (MACEH1), and protocol port 80. Protocol port 80 may be a Transmission Control Protocol (TCP) port. Controller 18 may process access control list 132 to determine that network packets received at logical port VP2 of virtual switch VSW1 having source MAC address MACEH1 and TCP protocol port 80 should be dropped (i.e., packets matching the network attributes identified in control list 132 should be dropped). Use of logical ports such as VP2 of virtual switch VSW1 may provide flexibility to a network administrator in configuring the network, as virtual network topology 120 may have any desired arrangement of virtual switches and assignment of end hosts to the virtual switches. Controller 18 may subsequently generate and provide flow table entries to the underlying physical and/or hypervisor switches of underlying network 100 that implement access control list 132.

FIG. 9 is an illustrative flow table entry that controller 18 may generate in implementing access control list 132. As shown in FIG. 9, flow table entry 142 may include the MAC address of end host EH1 in a source MAC address field, the MAC address of end host EH2 in a destination MAC address field, and port 80 in a TCP port field. Flow table entry 142 may include additional matching fields that are wildcarded (not shown) so that flow table entry 142 matches all packets having source MAC address MACEH1, destination MAC address MACEH2, and TCP port 80.

Flow table entry 142 may be provided to one or more physical or hypervisor switches in implementing access control list 132. For example, flow table entry 142 may be provided to switch SW3. In this scenario, any network packets received by switch SW3 from end host EH1 (i.e., having MAC address MACEH1) and destined for end host EH2 (i.e., having MAC address MACEH2) with TCP port 80 may be dropped as determined from the action field of flow table entry 142. Switch SW3 may be a suitable recipient of flow table entry 142, because access control list 132 is defined at logical port VP2 of VSW2 to which end host EH3 is assigned and end host EH3 is attached to port P2 of switch SW3 of the underlying network. However, as virtual switch VSW2 is a distributed virtual switch, controller 18 may select any desired underlying switches for implementing access control list 132 via flow table entries. For example, controller 18 may generate and provide flow table entry 144 of FIG. 10 to switch SW1.

As shown in FIG. 10, flow table entry 144 matches network packets destined for end host EH2 (e.g., having destination MAC address MACEH2), TCP port 80, and received at port P1 (of switch SW1). Flow table entry 144 may be suitable for providing to switch SW1, because end host EH1 is attached to port P1 of switch SW1 and therefore packets from end host EH1 are processed by switch SW1. Flow table entry 144 may direct switch SW1 to drop network packets that are received from end host EH1 (via port P1) and are destined for end host EH2 on TCP port 80. Each of flow table entries 144 and 142, although provided to different switches of underlying network 100, may effectively implement network policy rule 132 in preventing end host EH1 from communicating with end host EH2 on TCP port 80. If desired, multiple flow table entries may be provided to different switches in implementing a network policy rule. For example, controller 18 may provide flow table entries to any desired combination of switches SW1, SW2, and SW3 in implementing access control list 132.

Figure 11:
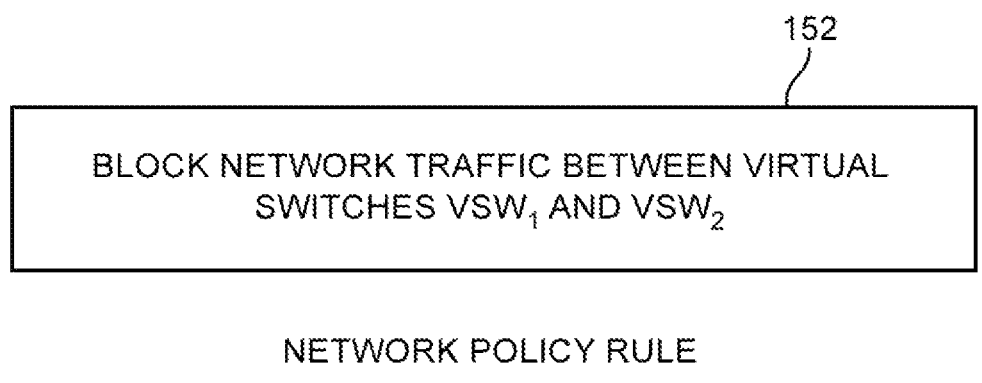
FIG. 11 is an illustrative network policy rule that may be implemented by a controller in accordance with an embodiment of the present invention.

FIG. 11 is an illustrative diagram of a network policy rule that may be implemented by controller 18. As shown in FIG. 11, network policy rule 152 defines that network traffic between virtual switches VSW1 and VSW2 should be blocked. Network policy rule 152 may be defined as a routing rule for virtual router VR1. Controller 18 may process network policy rule 152 to generate flow table entries for switches of underlying network 100 that block network traffic between virtual switches VSW1 and VSW2. For example, flow table entries that match network packets with source end host information identifying end hosts of virtual switch VSW1 and destination end host information identifying end hosts of virtual switch VSW2 may be provided to one or more switches of underlying network 100. In this scenario, the flow table entries may direct the switches to drop network packets that match the flow table entries.

Figure 12:
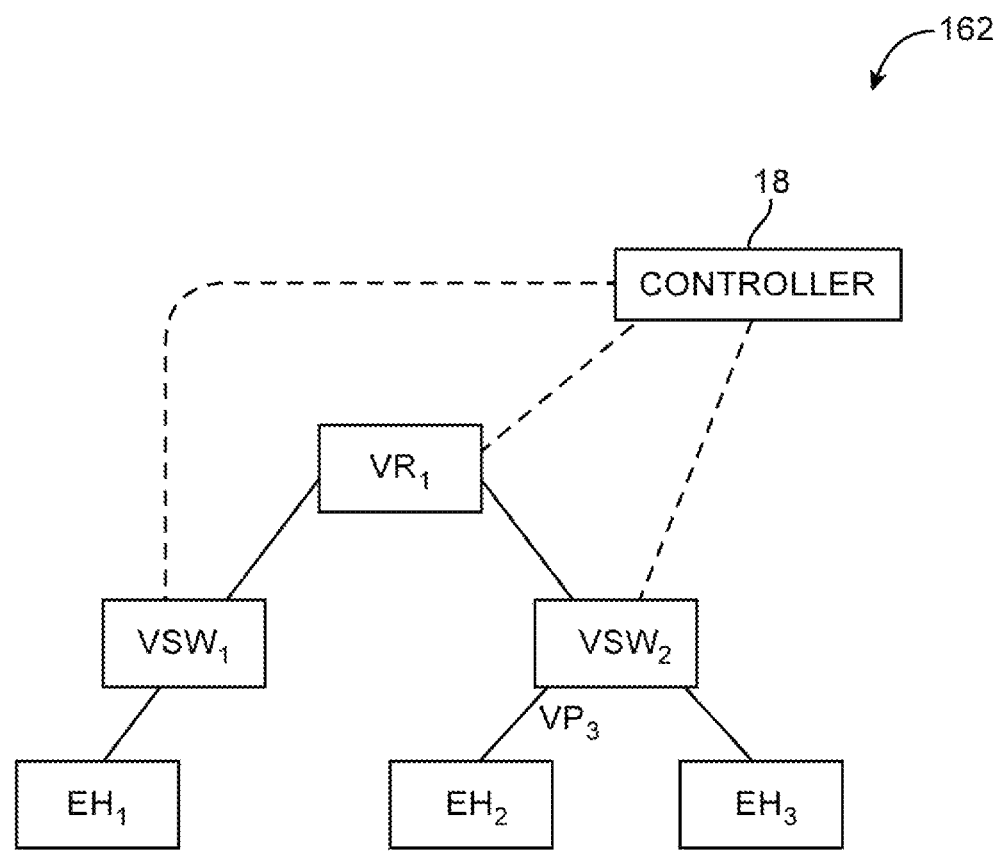
FIG. 12 is a diagram of a scenario in which a virtual network may be modified by a controller in accordance with an embodiment of the present invention.

Virtual network topologies may be redefined as desired, which provides flexibility in network configuration and network policy enforcement. As shown in the example of FIG. 12, virtual network topology 162 may be generated by reassigning end host EH2 of virtual network topology 120 of FIG. 7 to virtual switch VSW2. Reassignment of end hosts may be performed without modifying underlying network 100 (e.g., end host EH2 may remain attached to port P2 of switch SW3). In virtual network topology 162, end host EH2 is assigned to virtual port VP3 of virtual switch VSW2.

It can be challenging to maintain appropriate network policy rules for a virtual network topology that is modified over time. Consider the scenario in which access control list 132 of FIG. 8 and network policy rule 152 of FIG. 11 are implemented by controller 18 for virtual network topology 120 of FIG. 7 using flow table entry 141 of FIG. 9. In this scenario, if virtual network topology 120 is modified into topology 162 of FIG. 12 via reassignment of end host EH2, access control list 132 is no longer valid (e.g., because access control list 132 is defined for virtual port VP2 of virtual switch VSW1 which is no longer assigned any end hosts). As end host EH2 is now connected to virtual switch VSW2, network packets sent from end host EH1 to end host EH2 on TCP port 80 are still blocked, because network policy rule 152 blocks all network traffic between virtual switches VSW1 and VSW2. It can therefore be challenging to identify that access control list 132 is invalid, because the desired network operations of access control list 132 are implemented by network policy rule 152.

Figure 13:
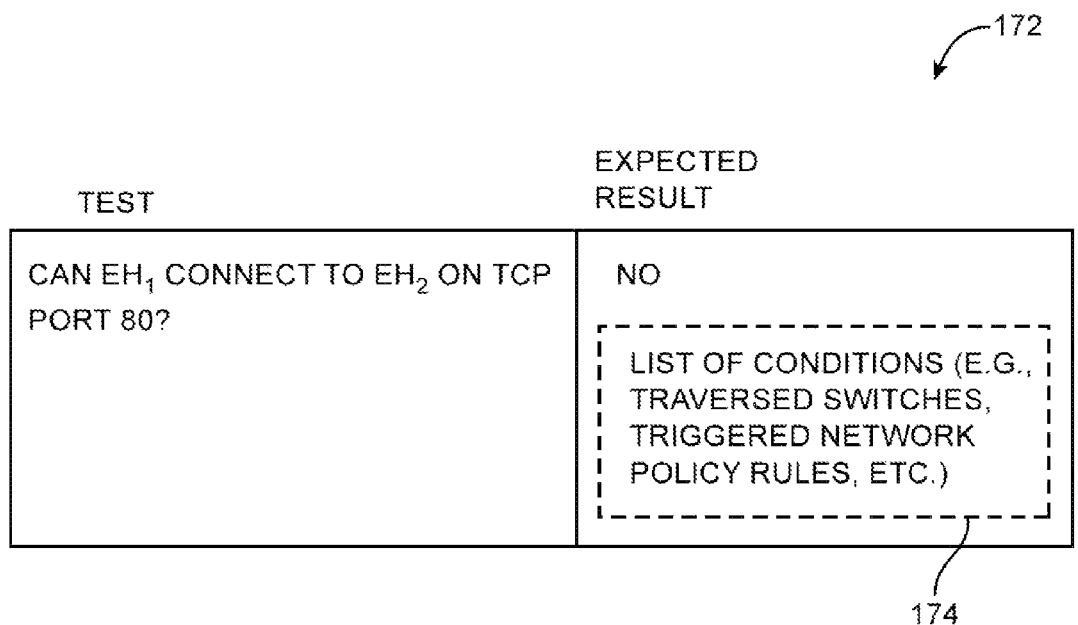
FIG. 13 is an illustrative testing rule that may be used by a controller in testing network policy rules in accordance with an embodiment of the present invention.

As controller 18 may implement hundreds, thousands, or more network policy rules, network modifications over time can invalidate a substantially number of network policies. Controller 18 may perform test operations that may help to identify invalid network policy rules, network modifications, or otherwise test the functions of a network. Controller testing operations may be defined by a user such as a network administrator using test rules. FIG. 13 is a diagram of an illustrative test rule 172 that may be provided to controller 18. Test rule 172 may be used in performing test operations and therefore may sometimes be referred to as a testing rule.

Test rule 172 may include test parameters and expected results for a test to be performed. In the example of FIG. 13, the test parameters identify that the controller is to test whether end host EH1 can connect to end host EH2 on TCP port 80. As an example, the test parameters may define end host EH1 as a source end host, end host EH2 as a destination end host, and TCP port 80. The expected results may be yes or no (e.g., true/pass or false/fail). If desired, the expected results may include an optional list of conditions 174. Optional list of conditions 174 may include a list of traversed switches, triggered network policy rules, or other information produced in performing tests based on test rule 172.

Figure 14:
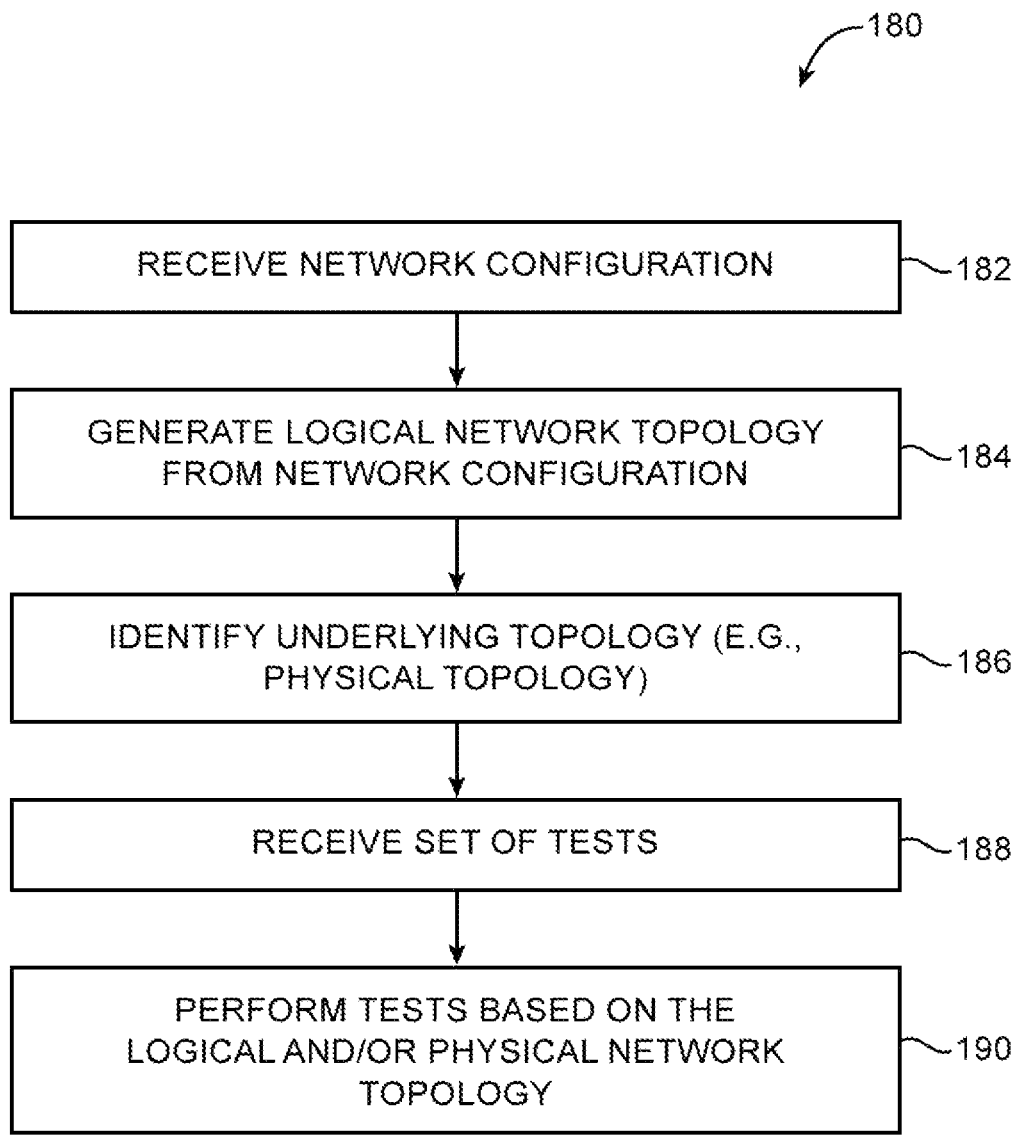
FIG. 14 is a flow chart of illustrative steps that may be performed by a controller in testing network policy rules in accordance with an embodiment of the present invention.

FIG. 14 is a flow chart 180 of illustrative steps that may be performed by a controller in performing tests defined by test rules such as rule 172 of FIG. 13.

During step 182, the controller may receive a network configuration. For example, the network configuration may be user-defined and may include assignments of end hosts to virtual switches and assignments of virtual switches to virtual routers.

During step 184, the controller may generate a logical network topology from the network configuration. For example, virtual network topology 120 of FIG. 7, virtual network topology 162 of FIG. 12, or any desired virtual network topology may be generated as defined by the network configuration.

During step 186, the controller may identify the underlying topology of the generated logical network topology. The controller may communicate with physical and hypervisor switches over control paths in determining the network topology that underlies the virtual network topology (e.g., identifying connections between switches in the underlying network topology).

During step 188, the controller may receive a set of test rules. In general, the set of test rules may be user-defined and each test rule may, if desired, determine a test for testing the validity of one or more respective network policies. For example, the controller may receive test rule 172 of FIG. 13 that tests the validity of access control list 132 of FIG. 8.

During step 190, the controller may perform tests for each of the test rules. The tests may be performed based on the logical and/or physical network topology. Tests may be performed via simulation at the controller or via injection of a test packet into the network.

The order of steps 182-190 in the example of FIG. 14 is merely illustrative. If desired, these steps may be performed in any desired order to perform tests on a network. For example, user-defined tests may be received during network configuration or at any time during normal network operations. If desired, the controller may perform the steps of flow chart 180 periodically (e.g., every 5 milliseconds, every 100 milliseconds, every 10 seconds, etc.).

Figure 15:
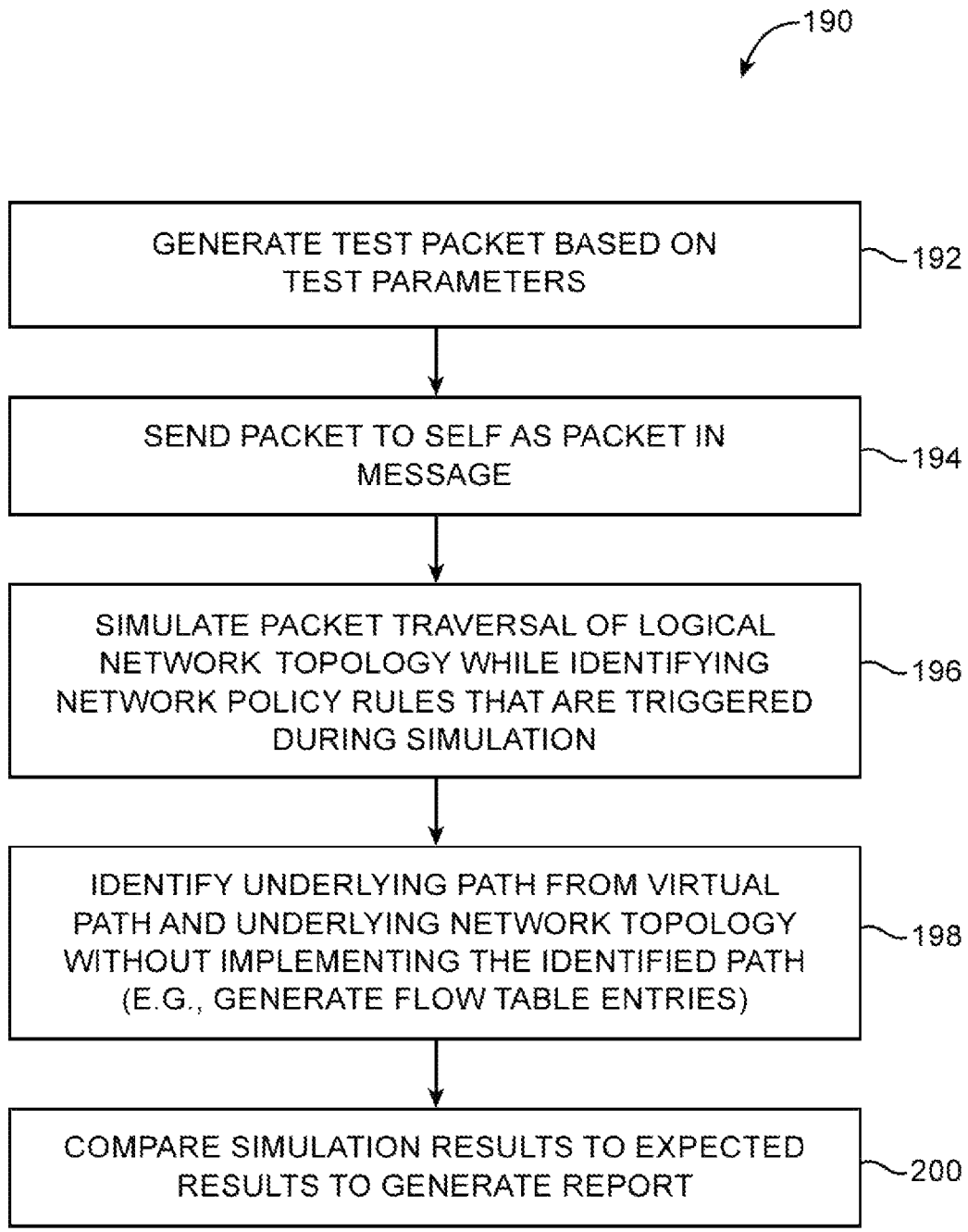
FIG. 15 is a flow chart of illustrative steps that may be performed by a controller in simulating a test packet to test a network policy rule in accordance with an embodiment of the present invention.

FIG. 15 is an illustrative flow chart 190 of steps that may be performed by a controller to perform a test of a test rule via simulation. The steps of flow chart 190 may, for example, be performed during step 190 of FIG. 14.

During step 192, the controller may generate a test packet based on the test parameters of the test rule. For example, for testing rule 172 of FIG. 13, the controller may generate a test packet that imitates a packet sent by end host EH1 to end host EH2 using TCP port 80. In this scenario, source packet header fields may be populated with the information of source end host EH1 (e.g., the MAC and/or IP address of end host EH1), whereas destination packet header fields may be populated with the information of destination end host EH2. Additional test parameters such as TCP port 80 may be stored in corresponding header fields (e.g., a TCP port header field) of the test packet.

During step 194, the controller may send the packet to itself, which imitates a switch that forwards the packet to the controller. The controller may send the packet as a Packet In message that includes additional information that would have been included by the switch (e.g., identifying a switch port at which the packet was received from an end host). This example is merely illustrative. In general, during step 194, the controller may initialize testing of the generated test packet by simulating network operations in processing a typical network packet (e.g., by stimulating or otherwise triggering processing of the generated test packet).

During step 196, the controller may simulate packet traversal of the logical network topology (e.g., a logical network topology such as topology 120 of FIG. 7 that was previously generated by the controller during step 184 of FIG. 14). In simulating the packet traversal, the controller may identify virtual paths through the virtual network topology between the source end host and the destination end host of the network packet. The controller may identify network policy rules that are triggered or otherwise match the identified virtual paths.

During step 198, the controller may use the identified virtual path in identifying a path through the underlying network of physical and/or hypervisor switches. For example, the controller may determine a path from the source end host to the destination end host through the underlying network. The physical and/or hypervisor switches in the identified path through the underlying network may normally (e.g., during non-testing controller operations) be provided with flow table entries that direct the switches to generate the identified path (e.g., by forwarding or dropping packets to satisfy the network policy rules identified during step 196). However, the controller generates the flow table entries during step 196 without providing the flow table entries to the switches. In other words, the identified path is not implemented.

During step 200, the controller may compare the simulation results from steps 196 and 198 to expected results. Consider the scenario in which test rule 172 of FIG. 13 is performed by the controller. In this scenario, the controller may generate a test packet from end host EH1 to end host EH2 that uses TCP port 80 (step 192). The controller may subsequently initiate simulation of the test packet (step 194). The controller may simulate traversal of the test packet through logical network topology 120 of FIG. 7 to identify a path from end host EH1 to end host EH2 through virtual switch VSW1. The controller may identify that access control list 132 defines that the test packet should be dropped at virtual port VP2 of virtual switch VSW1 (step 196). The controller may identify a path through switches SW1, SW2, and SW3 of underlying network 100 of FIG. 6 and generate flow table entries such as flow table entries 142 or 144 of FIGS. 9 and 10 without providing the generated flow table entries to the switches (step 198). During step 200, the controller may determine that the simulated result (e.g., that the test packet would have been dropped per access control list 132) matches the expected result of test rule 172 (i.e., that end host EH1 should not be able to connect to end host EH2 on TCP port 80).

Consider an alternate scenario in which virtual network topology 120 of FIG. 7 is modified to become virtual network topology 162 of FIG. 12 while access control list 132 of FIG. 8 and network policy rule 152 of FIG. 11 are enforced by controller 18. In this scenario steps 192-198 may be performed similarly as in the previous scenario, however the simulation results may identify that only network policy rule 152 was triggered during step 196. The generated report may be used to help identify that access control list 132 is no longer valid (i.e., because the test packets do not trigger access control list 132). Access control list 132 may be subsequently removed to help improve controller performance by reducing the number of network policy rules.

Figure 16:
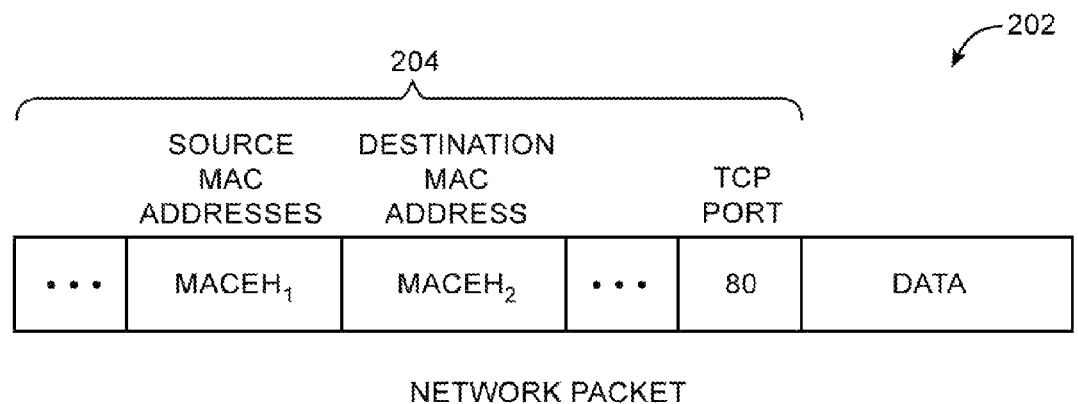
FIG. 16 is an illustrative network packet that may generated as a test packet by a controller in accordance with an embodiment of the present invention.

FIG. 16 is an illustrative diagram of a network packet that may be sent from a source end host to a destination end host. As shown in FIG. 16, network packet 202 may include header fields 204 and data to be conveyed from the source end host to the destination end host over the network. The header fields may include layer 3 (L3) header fields such as a source internet protocol (IP) address, a destination IP address, a TTL field, etc. The header fields may include layer 2 (L2) header fields such as a source Ethernet address, a destination Ethernet address, and a virtual local area network (ULAN) identifier. In the example of FIG. 16, network packet 202 includes the MAC address of end host EH1 (MACEH1) as a source MAC address, the MAC address of end host EH2 (MACEH2) as a destination MAC address, and TCP port 80. Network packet 202 may be a packet sent from source end host EH1 to destination end host EH2. Similarly, network packet 202 may be a test packet generated by a controller to simulate a packet sent from end host EH1 to end host EH2 (e.g., during step 192 of FIG. 15).

Figure 17:
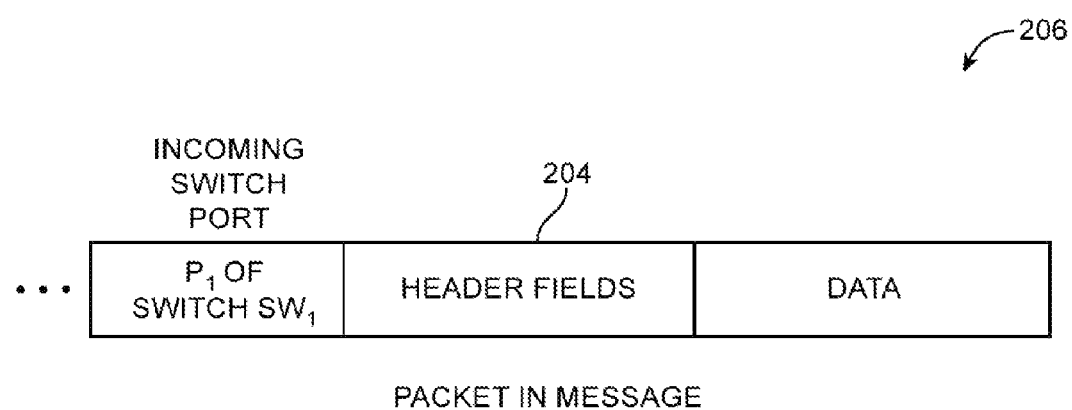
FIG. 17 is an illustrative Packet In message that may be generated by a controller in accordance with an embodiment of the present invention.

FIG. 17 is an illustrative Packet In message 206 that may be received by a controller from switches or from itself. Packet In message 206 may include a network packet as well as additional information from the switch that sent the Packet In message. In the example of FIG. 17, Packet In message 206 includes network packet 202 of FIG. 16 and identifies incoming switch port P1 of switch SW1 as the switch port at which network packet 202 was received. In this scenario, Packet In message 206 may be provided to controller 18 by switch SW1 of FIG. 6 in response to receiving network packet 202 from end host EH1 at switch port P1. Similarly, controller 18 may generate Packet In message 206 in performing network policy rule tests (e.g., during step 194 of FIG. 15).

In some scenarios, it can be challenging for a controller to fully simulate a test packet traversing a network. Consider the scenario in which switch SW2 of FIG. 6 is a non-client switch that is not controlled by controller 18 (e.g., switch SW2 does not include a controller client, is not coupled to controller 18 by a control path 66, and therefore does not communicate with controller 18 over a control path). In this scenario, switch SW2 operates independently of controller 18 and simulation of the operations of switch SW2 by controller 18 may potentially be inaccurate and lead to incorrect test results. In scenarios such as when portions of a network operate independently of the controller, the controller may perform network policy rule testing by directly injecting a test packet into the network and observing how the switches forward the test packet. To track a test packet that is injected into a network, the controller may tag the test packet with identification information.

Figure 18:
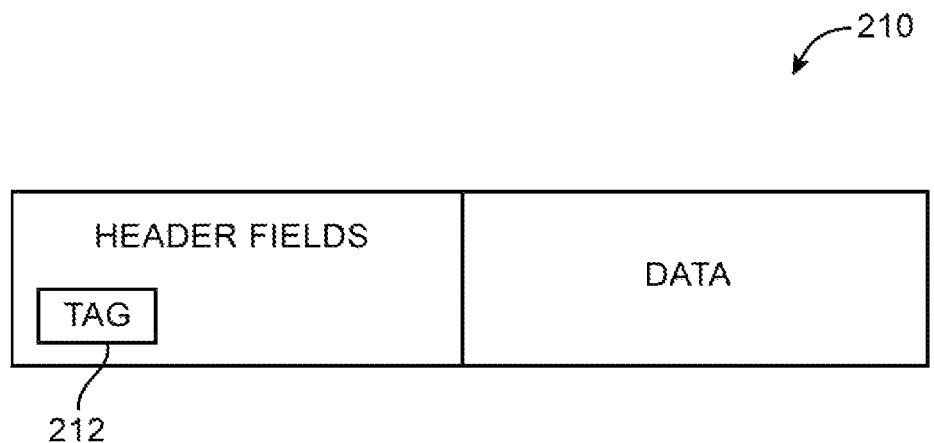
FIG. 18 is an illustrative tagged network packet that may generated by inserting identification information into header fields of a network packet in accordance with an embodiment of the present invention.

FIG. 18 is an illustrative tagged test packet 210 that may be injected by a controller into a network. As shown in FIG. 18, tag 212 may be inserted into the header fields of a network packet to produce tagged network packet 210. Tag 212 may be formed of any desired number of bits and may be inserted into unused portions of the header fields of the original network packet. For example, tag 212 may be stored in unused portions of a VLAN header field, an IP header field, a VLAN header field, or any desired packet header field.

Figure 19:
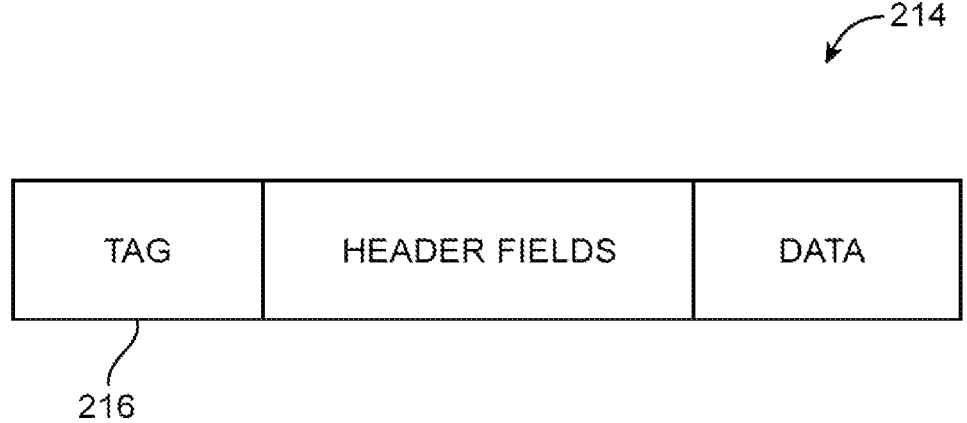
FIG. 19 is an illustrative tagged network packet that may generated by encapsulating a network packet in accordance with an embodiment of the present invention.

If desired, a test network packet may be encapsulated to form encapsulated packet 214 as shown in FIG. 19. For example, a network packet may be encapsulated using tunneling protocols such as Multi-Protocol Label Switching (MPLS), Virtual Extensible LAN (VxLAN), MAC-in-MAC, Generic Routing Encapsulation (GRE), or any desired protocol for encapsulating network packets. Encapsulating the network packet may include appending tag 216 to the original network packet (e.g., in a new, additional header field), thereby producing a tagged network packet.

Figure 20:
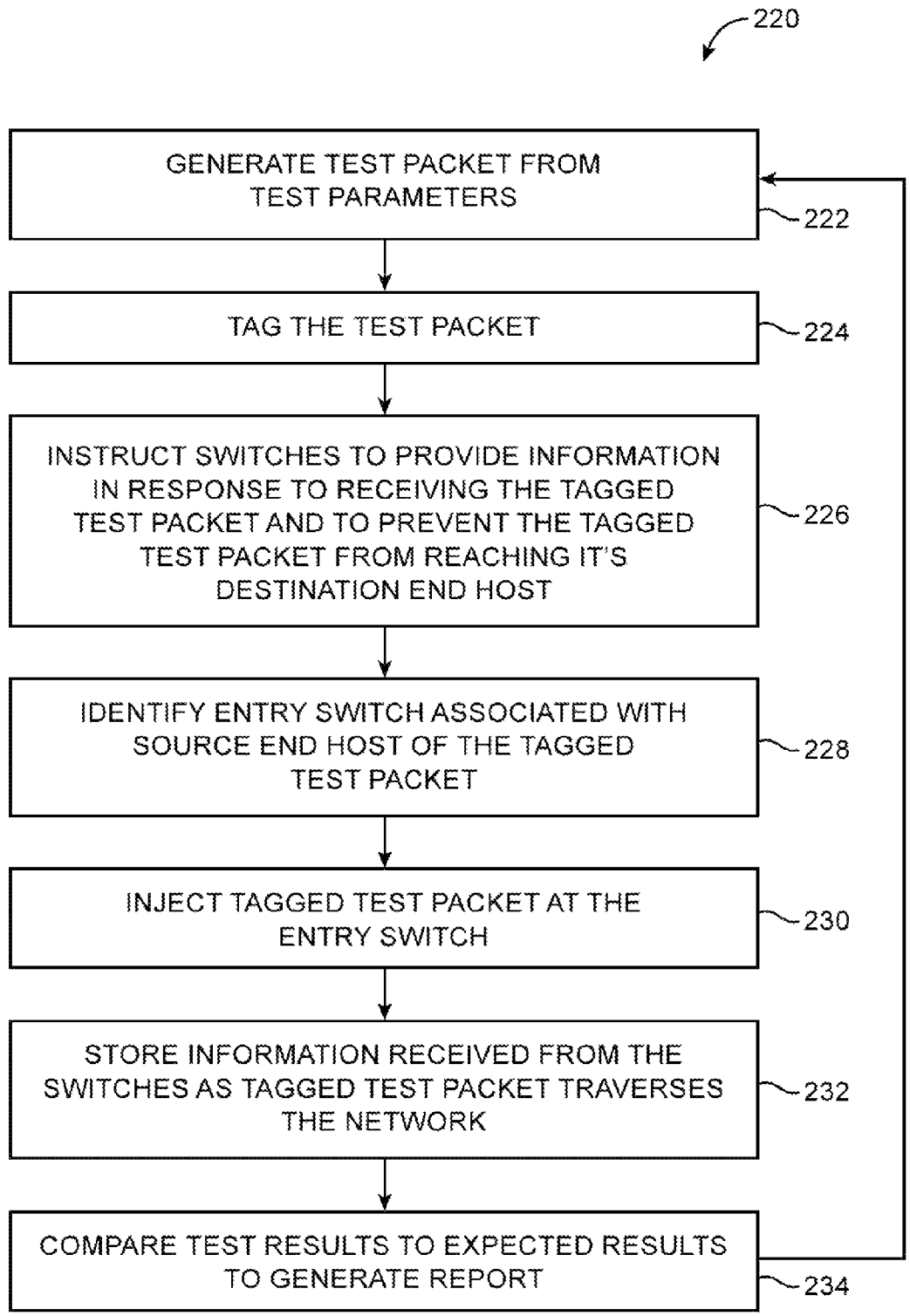
FIG. 20 is a flow chart of illustrative steps that may be performed by a controller in testing a network policy rule by injecting a tagged test packet into a network in accordance with an embodiment of the present invention.

FIG. 20 is a flow chart 220 of illustrative steps that may be performed by a controller to perform network policy rule testing by injecting a tagged network packet into a network.

During step 222, the controller may generate a test packet based on test parameters of a testing rule (e.g., similar to step 192 of FIG. 15).

During step 224, the controller may tag the test packet with identification information. For example, the controller may generate tagged network packet 210 or tagged network packet 214 from the test packet.

During step 226, the controller may instruct the switches of the network to provide information in response to receiving the tagged test packet while preventing the tagged test packet from reaching its destination end host. For example, the controller may instruct the switches to forward a copy of the network packet as a Packet In message to the controller in addition to forwarding the network packet normally to the destination end host. The controller may control the switches to prevent the tagged test packet from reaching its destination end host by controlling the switch to which the destination end host is attached (e.g., by directing that switch not to forward the tagged test packet to the destination end host). As an example, the controller may provide the switches with flow table entries that match the tagged network packet and direct the switches to forward information relating to the tagged network packet to the controller (e.g., as a Packet In message). In this scenario, the flow table entries may include the tag in a corresponding packet header matching field so as to match the tagged network packet that also includes the tag in the corresponding packet header field.

During step 228, the controller may identify an entry switch associated with the source end host of the tagged test packet (e.g., the entry switch that is attached to the source end host or the client switch that is closest in the network topology to the source end host).

During step 230, the controller may inject the tagged test packet at the entry switch. For example, the controller may send a message to the entry switch that includes the tagged test packet and instructions to process and forward the tagged test packet (e.g., to process the tagged test packet based on flow table entries previously provided by the controller).

As the switches in the network forward the tagged network packet, the switches may forward information on the tagged network packet to the controller (e.g., in accordance with instructions provided by the controller during step 226). The controller may receive and store the information on the tagged network packet from the switches as test results. The controller may process the information received from the switches to produce test results. For example, the controller may process the information to identify the path through the switches that is traversed by the tagged network packet.

During step 234, the controller may compare the test results to the expected results of the test rule (e.g., test rule 172 of FIG. 13. The controller may produce a report identifying whether the test results match the expected results. If desired, the controller may include information such as identifying the path traversed by the network packet through the network (e.g., a path through physical and/or hypervisor switches).

The foregoing is merely illustrative of the principles of this invention and various modifications can be made by those skilled in the art without departing from the scope and spirit of the invention.

What is claimed is:

1. A method of using a controller that controls switches using a centralized control protocol in a network having end hosts that are coupled to the switches, the method comprising:
    at the controller, receiving a given network policy rule;
    using the controller, generating virtual switches from groups of end hosts, wherein each virtual switch has virtual ports assigned to respective end hosts and wherein the given network policy rule is defined for a given virtual port;
    using the controller, generating a virtual network topology from the virtual switches;
    at the controller, identifying a physical network topology underlying the generated virtual network topology, wherein the physical network topology comprises physical switches having physical ports coupled to the end hosts, and wherein generating the virtual switches comprises assigning a first end host coupled to a physical port of a first physical switch and a second end host coupled to a second physical port of a second physical switch to a first virtual switch in the virtual network topology;
    at the controller, receiving a testing rule that identifies test parameters and expected test results, wherein the expected test results are determined from data selected from a group consisting of user input data and simulation data; and using the controller, performing a test in determining whether the network satisfies the given network policy rule, wherein the expected test results include network policy rules that are expected to be triggered while performing the test, wherein performing the test in determining whether the network satisfies the given network policy rule comprises performing the test based on the generated virtual network topology, and wherein performing the test in determining whether the network satisfies the given network policy rule based on the generated virtual network topology comprises:
  generating a test packet based on the test parameters of the received testing rule;
  generating actual network policy rules that are triggered using the test packet; and
  comparing the actual network policy rules to the network policy rules that are expected to be triggered to identify invalid network policy rules.

2. The method defined in claim 1 wherein performing the test in determining whether the network satisfies the given network policy rule based on the generated virtual network topology further comprises:
  simulating packet traversal of the test packet through a virtual path of the virtual network topology.

3. The method defined in claim 2 wherein the controller implements a plurality of network policy rules that include the given network policy rule, the method further comprising:
  identifying network policy rules that are triggered during simulation of the packet traversal of the virtual network topology.

4. The method defined in claim 3 wherein performing the test in determining whether the network satisfies the given network policy rule based on the generated virtual network topology further comprises:
  determining a set of physical switches that form an underlying path of the virtual path.

5. The method defined in claim 4 wherein performing the test in determining whether the network satisfies the given network policy rule based on the generated virtual network topology further comprises:
  generating flow table entries that implement the underlying path of the virtual path without providing the flow table entries to the set of physical switches.

6. The method defined in claim 5 wherein performing the test in determining whether the network satisfies the given network policy rule based on the generated virtual network topology further comprises:
  comparing results of the simulated packet traversal with the expected test results to determine whether the network satisfies the given network policy rule.

7. The method defined in claim 6 wherein the expected test results of the testing rule include a list of network policy rules that are expected to be triggered and wherein comparing the results of the simulated packet traversal with the expected test results to determine whether the network satisfies the given network policy rule comprises:
  comparing the list of network policy rules to the triggered network policy rules.

8. The method defined in claim 1 wherein performing the test in determining whether the network satisfies the given network policy rule based on the generated virtual network topology further comprises:
  generating a tagged test packet from the test packet;
  injecting the tagged test packet into the network; and
  based on the expected test results of the testing rule and on information received from the switches on the tagged test packet, determining whether the network satisfies the given network policy rule.

9. The method defined in claim 8 wherein performing the test in determining whether the network satisfies the given network policy rule based on the generated virtual network topology further comprises:
  providing flow table entries to the switches that direct the switches to send information on the tagged test packet to the controller, wherein the flow table entries prevent the switches from forwarding the tagged test packet to a destination end host of the tagged test packet; and
  based on the information from the switches and the expected test results of the testing rule, determining whether the network satisfies the given network policy rule.

10. The method defined in claim 1, further comprising:
  with the controller, generating a virtual router from groups of the virtual switches; and
  with the controller, generating the virtual network topology from the virtual switches and the virtual router.

11. The method defined in claim 10, wherein a respective interface of the virtual router is coupled to each of the virtual switches, further comprising:
  with the controller, establishing a plurality of broadcast domains for the network by assigning respective internet protocol (IP) address ranges to each of the interfaces of the virtual router.

12. The method defined in claim 1, further comprising:
  with the controller, reassigning the first end host to a second virtual switch that is different from the first virtual switch without modifying the physical network topology underlying the generated virtual network topology.

13. A method of using a controller that controls switches using a centralized control protocol in a network having end hosts that are coupled to the switches, the method comprising:
  using the controller, sending probe packets through the network to discover a topology of the network that includes a virtual topology of the network;
  at the controller, maintaining network topology information for the network;
  at the controller, receiving a user-defined testing rule;
  at the controller, based on the user-defined testing rule, generating a test packet that is different from the probe packets;
  at the controller, generating a Packet In message that includes the test packet and that is different from the probe packets;
  using the controller, sending the Packet In message generated by the controller to the controller over the network;
  at the controller, receiving the Packet In message that was sent by the controller; and
  at the controller, determining whether the network satisfies the user-defined testing rule by processing the test packet in the received Packet In message based on the network topology information, wherein processing the test packet comprises:
    using the controller, identifying a path through the switches in the network underlying the virtual topology of the network, wherein the switches comprise physical switches; and
    using the controller, generating flow table entries for the physical switches that implement the path without providing the generated flow table entries to the physical switches.

14. The method defined in claim 13 further comprising:
forming virtual switches from groups of end hosts, wherein the network topology information includes network topology information for the switches and virtual network topology information for the virtual switches.

15. The method defined in claim 14 wherein the user-defined testing rule includes expected results and test parameters identifying a source end host and a destination end host, wherein the test packet identifies the source end host and the destination end host of the user-defined testing rule, and wherein processing the test packet comprises:
simulating traversal of the test packet from the source end host to the destination end host through the network based on the network topology information.

16. The method defined in claim 15 wherein determining whether the network satisfies the user-defined testing rule comprises:
determining whether the simulated traversal of the test packet matches the expected results of the user-defined testing rule.

17. The method defined in claim 13, wherein generating the Packet In message comprises appending additional information to the test packet, wherein the additional information comprises information about a switch port of a switch in the network that is separate from the controller.

18. The method defined in claim 13, wherein the probe packets comprise Link Layer Discovery Protocol (LLDP) packets and generating the test packet comprises generating the test packet after the topology of the network has been discovered by sending the probe packets through the network.

19. A method of using a controller that controls switches in a network using a centralized control protocol, the method comprising:
at the controller, sending probe packets through the network to discover a topology of the network;
at the controller, receiving a user-defined testing rule;
at the controller, based on the user-defined testing rule, generating a tagged test packet that is different from the probe packets;
using the controller, injecting the tagged test packet into the network, wherein generating the tagged test packet comprises:
generating a test packet having a header field, and
inserting a predetermined number of bits of identification information into an unused portion of the header field of the generated test packet to produce the tagged test packet;
at the controller, generating a flow table entry having a matching field that matches on the predetermined number of bits of identification information inserted into the unused portion of the header field of the generated test packet and having an action field that instructs the switches to provide information on the test packet to the controller;
using the controller, providing the flow table entry to the switches in the network; and
at the controller, generating additional flow table entries that are provided to the switches in the network, wherein the additional flow table entries prevent the switches from forwarding the generated test packet to a destination end host of the generated test packet.

20. The method defined in claim 19 further comprising:
identifying a path traversed by the tagged test packet based on the information on the test packet provided by the switches to the controller.

21. The method defined in claim 20 wherein the user-defined testing rule includes expected results, the method further comprising:
based on the identified path, determining whether the network satisfies the expected results of the user-defined testing rule.

22. The method defined in claim 19, wherein the header field of the generated test packet comprises an internet protocol (IP) header field and wherein inserting the predetermined number of bits of identification information into the unused portion of the header field comprises inserting the predetermined number of bits of identification information into an unused portion of the IP header field.

23. The method defined in claim 19, wherein the header field comprises a destination address associated with the destination end host, wherein the flow table entry controls a switch coupled to the destination end host not to forward the test packet to the destination end host.

* * * * *